United States Patent [19]
Kaminski

[11] 4,427,318
[45] Jan. 24, 1984

[54] BOLTED JOINT CONNECTION
[75] Inventor: Elton G. Kaminski, Sidney, Ohio
[73] Assignee: The Stolle Corporation, Sidney, Ohio
[21] Appl. No.: 398,956
[22] Filed: Jul. 16, 1982
[51] Int. Cl.³ .............................................. F16B 7/18
[52] U.S. Cl. .................................... 403/408; 403/388
[58] Field of Search ................... 403/408, 13, 14, 388, 403/159

[56] References Cited
U.S. PATENT DOCUMENTS
3,408,665 11/1968 Harris ............................. 403/388 X
FOREIGN PATENT DOCUMENTS
2456242 1/1981 France ................................ 403/388

Primary Examiner—Andrew V. Kundrat
Attorney, Agent, or Firm—Frost & Jacobs

[57] ABSTRACT

A joint connection for connecting two metallic members to prevent relative movement between the members. One of the members is provided with a hollow deformable boss having inwardly sloping sides which is configured to slip fit partially within a cooperating aperature in the other member. The members are squeezed together by a nut and bolt such that the boss deforms and makes metal-to-metal contact with the other member and with the shank of the bolt. A first embodiment describes the joint connection with a hollow tube and U-shaped bracket. A second embodiment describes the connection for securing flat plates in parallel overlapping relationship.

3 Claims, 5 Drawing Figures

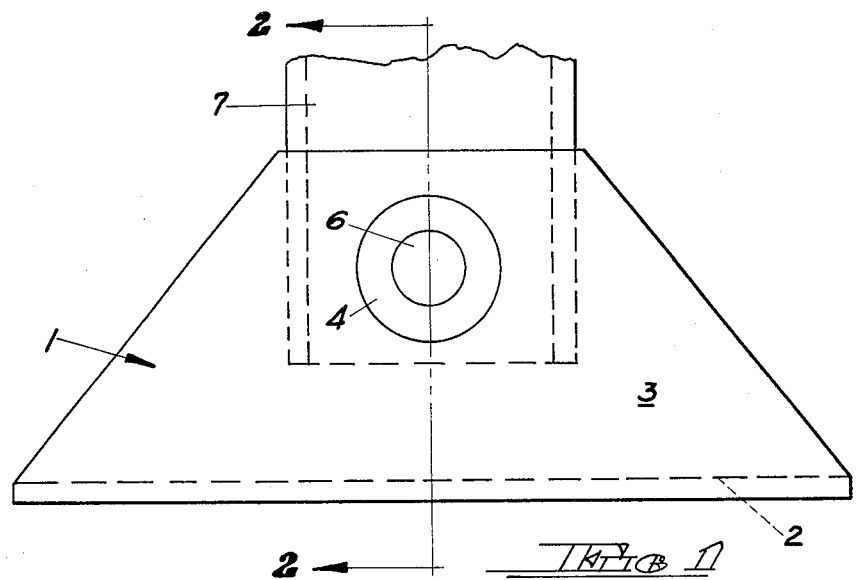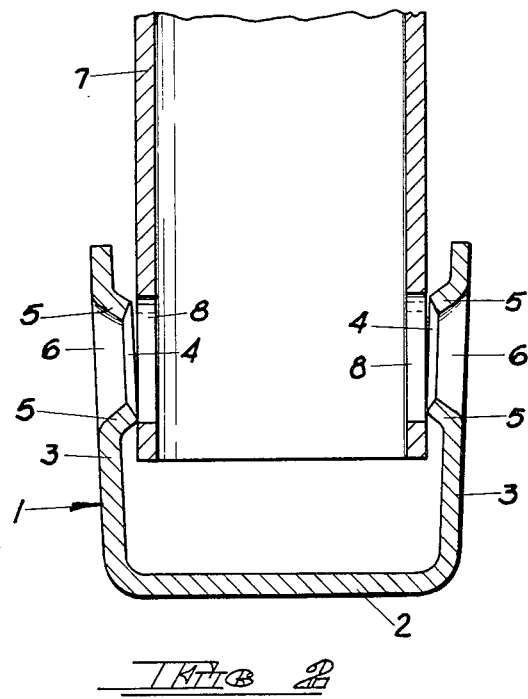

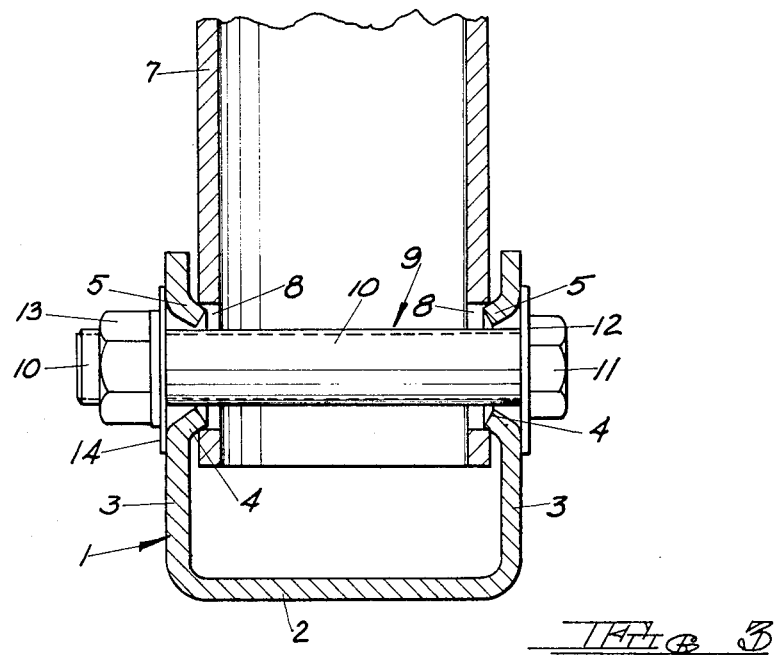
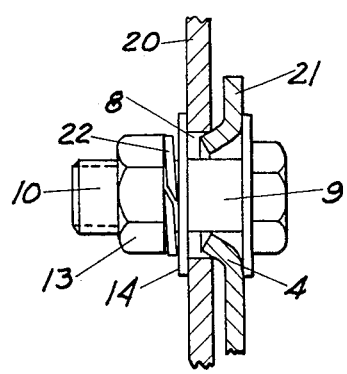
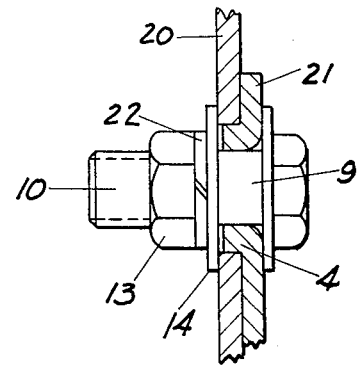

BOLTED JOINT CONNECTION

SUMMARY OF THE INVENTION

The present invention is directed generally to a method of connecting together two metallic parts, and more particularly to a connection in which the parts to be joined may be easily fitted together, but once joined, are held against relative movement.

There is a countless number of methods for bolting together metallic assemblies which, after assembly, prevent relative movement between the bolted assemblies. For example, this may be accomplished by restricting the size of the bolt holes in the members to be joined. In fact, in some instances, the bolt must actually be driven forcibly through the holes which offer no clearance over the basic bolt diameter, thereby resulting in an interference fit. It has been found that such an arrangement is successful if the bolt is a machined bolt, i.e. the diameter over the threads is the same as the diameter of the shank of the bolt. However, in the case of bolts whose threads are rolled, the diameter over the threads is larger than the shank diameter. Consequently, when the holes in the members to be joined are sized to provide no clearance over the threads, in fact clearance does exist over the shank since its diameter is smaller. Consequently, after the members have been joined, the interference fit is lost which would otherwise prevent movement between the members.

Of course, another conventional method for joining such assemblies is to overtighten the nut and bolt assembly joining the members. In the case where one of the members being joined is a pipe or tube, this method may result in flattening of the pipe, and is therefore generally unsatisfactory.

The present invention is directed to a bolted joint connection for connecting first and second members, particularly metallic members, to prevent relative movement between them once they have been joined. One of the members is provided with an outwardly extending hollow boss having inwardly sloping sides. A bore extends axially through the boss. The other member to be joined includes an opening into which the boss is partially fitted. A bolt is passed through the boss bore and aperture. Means, such as a threaded nut, is operatively connected to the bolt for drawing the first and second members tightly together such that the boss is deformed and forced into the aperture such that it is urged against the other metallic member and the outer surface of the bolt shank. The connection thus relies on an interference fit between the joining members to prevent relative movement, without the risk of deforming either of the members.

While for purposes of an exemplary showing, the present invention has been described and illustrated in connection with a mounting bracket joined to a tube, and for joining flat plates, it will be understood that the inventive principles may be extended to joining members of any shape and size.

Further details of the invention will become apparent from the detailed description which follows.

BRIEF DESCRIPTION OF THE DRAWING

FIG. 1 is a fragmentary side elevational view of a first embodiment of the present invention for joining a mounting bracket to a tube with the members to be joined fitted together, but not secured.

FIG. 2 is a fragmentary cross sectional view taken along section line 2—2 of FIG. 1.

FIG. 3 is a fragmentary cross sectional view of the embodiment of FIG. 1, with the members secured together.

FIG. 4 is a fragmentary cross sectional view of a second embodiment of the present invention used to connect a pair of parallel extending flat plates.

FIG. 5 is a fragmentary cross sectional view of the embodiment of FIG. 4 with the flat plate members secured together.

DETAILED DESCRIPTION

For purposes of an exemplary showing, the first embodiment of the present invention illustrated in FIG. 1–FIG. 3 illustrates a trapezoidal-shaped bracket or support 1 of generally U-shaped cross section. Bracket 1 is formed by a bottom web portion 2 terminating at its side edges in up-turned flanges 3. It will be understood that bracket 1 will be constructed of any suitable formable material, particularly a metallic material such as aluminum, steel or the like.

Each flange is provided with an inwardly extending hollow boss 4 having generally inwardly sloping sides 5, giving the boss the appearance of a frustum of a circular cone. Each boss includes a circular bore 6 extending therethrough, the outer diameter of the bore being greater than the inner diameter of the bore due to the sloping nature of the boss sides.

The member to be joined to bracket 1 comprises a cylindrical tube or pipe 7, which also may be constructed of any suitable metallic material such as aluminum, steel or the like. The lower end of tube 7 is provided with a pair of coaxial apertures 8 having a diameter slightly greater than the smallest diameter of boss 4, but greater than the maximum diameter of boss 4. In other words, boss 4 can only be fitted partially within aperture 8.

As can best be seen in FIG. 2, the flange portions 3 of bracket 1 are slightly spread so that the lower end of tube 7 may easily fit between the innermost ends of bosses 4. The two members are initially fitted together by positioning tube 7 so that apertures 8 are substantially coaxial with the hollow bores 6 of the adjacent bosses.

An elongated bolt 9 having a threaded shank 10 is then slipped through both bosses as shown in FIG. 3. In general, the outer diameter of shank 10 will be just slightly smaller than the minimum diameter of bore 6 so that the bolt may easily pass therethrough.

One end of bolt 9 is provided with a hexagonally shaped bolt head 11 having at its inner surface a washer-like flange 12 which bears against the outermost surface of the right hand flange 3 as viewed in FIG. 3. A conventional threaded nut 13 is threaded onto the portion of bolt shank 10 which protrudes from the right-hand flange 3 as viewed in FIG. 3. If desired, a washer 14 may be provided between the inner face of bolt 12 and the outer surface of right-hand flange 3.

Nut 13 is then tightened on the threaded bolt to draw the flanges 3 tightly together such that each of the bosses is forced into the adjacent aperture. As can be seen in FIG. 3, the outer portion of the sides 5 of each boss is forced against the edge of the adjacent aperture 8, thereby creating a tight force fit. At the same time, the inner edge of the boss is forced tightly against the outer surface of shank 10, again creating a force fit. Consequently, as the boss is forced into each of the apertures, it deforms and is urged against the associated tube wall and outer surface of the bolt shank, thereby preventing relative movement of between the bracket 1, tube 7 and bolt 9.

It will be understood that the gauge of the metal used and the particular geometery of the hollow boss 4 will vary, depending upon the particular configuration of the members to be joined. Furthermore, the bolt shank may be provided with threads produced by either machine threading or thread rolling. In either event, as the bolt is tightened, the deformation of the bosses will hold the members securely together without the risk of collapsing the thin walled tube 7.

A second embodiment of the invention is illustrated in FIG. 4 and FIG. 5, where elements similar to those previously described have been similarly designated.

This configuration is intended to secure together two flat overlapping metallic members, one of which is designated 20, and the other of which is designated 21. Member 20 is provided with an aperture 8 similar in size and configuration to that previously described. Member 21 is provided with a hollow boss 4, also similar in size and configuration to that previously described.

A headed bolt 9 having a threaded shank 10, with an intermediate cooperating washer 14, nut 13, and optional lock washer 22, if desired.

As can be seen in FIG. 4, members 20 and 21 are initially assembled so that boss 4 fits partially within aperture 8. As in the previous embodiment, nut 13 is then tightened to draw members 20 and 21 tightly together such that the boss 4 is forced into aperture 8 and deforms as illustrated in FIG. 5. This action provide metal-to-metal contact between the outer surface of boss 4 and the inner surface of aperture 8 associated with member 20, as well as metal-to-metal contact between the inner surface of boss 4 and the outer surface of the shank portion of bolt 9. As in the previous embodiment, the members are now locked tightly together against relative movement.

It will be understood that various changes in the details, steps, materials and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. Joint means for connecting first and second metallic members, said first member comprising a U-shaped bracket having a lower web portion and flange portions extending from either end of the web portion, each of said flanges including an inwardly directed hollow boss with a bore extending axially therethrough, said second member comprising a hollow tube having a pair of opposed apertures extending through the side walls adjacent one end, said apertures being dimensioned slightly smaller than the maximum outside dimension of each said boss, each said boss being positioned to align with one of said apertures when said tube end is slip fitted between said flanges and being fitted partially within said aperture; bolt means including an elongated shank portion extending through each said bore and aperture; and means operatively connected to said bolt means for drawing said first and second members tightly together such that each said boss is forced into one of said apertures and urged against the second member and the outer surface of the bolt means shank to prevent relative movement between the first and second members, each said boss being configured to deform under pressure such that the outer surface of the boss makes metal-to-metal contact with the edge of one of the apertures and the inner surface of the boss make metal-to-metal contact with the shank.

2. The apparatus according to claim 1 wherein said bolt means comprises an elongated bolt having an enlarged head at one end positioned against the outer surface of one of said flanges, a threaded shank, and a nut threadedly engaged on the other end and positioned against the other of said flanges, said shank passing through said bosses and apertures.

3. The apparatus according to claim 1 wherein said flanges are angled slightly outwardly so that the tube may pass easily therebetween, said flanges being substantially parallel to each other when drawn tightly together against the outer surface of the tube.

* * * * *